(12) United States Patent
Judd

(10) Patent No.: US 7,882,600 B2
(45) Date of Patent: Feb. 8, 2011

(54) CABLE ORGANIZER

(76) Inventor: Brian T. Judd, 1663 Whitwood La., #2, Campbell, CA (US) 95008

( * ) Notice: Subject to any disclaimer, the term of this patent is extended or adjusted under 35 U.S.C. 154(b) by 0 days.

(21) Appl. No.: 11/505,506

(22) Filed: Aug. 16, 2006

(65) Prior Publication Data
US 2007/0157438 A1 Jul. 12, 2007

Related U.S. Application Data

(60) Provisional application No. 60/802,818, filed on May 22, 2006, provisional application No. 60/757,766, filed on Jan. 10, 2006.

(51) Int. Cl.
*F16G 11/00* (2006.01)
(52) U.S. Cl. ..................... 24/115 R; 24/129 R; 24/339; 24/336
(58) Field of Classification Search ................ 24/16 R, 24/336, 339, 370, 371, 373–376, 601.2, 601.7, 24/115 R, 129 R, 129 A
See application file for complete search history.

(56) References Cited

U.S. PATENT DOCUMENTS

| 1,390,980 | A | * | 9/1921 | Budrow ..................... 24/577.1 |
|---|---|---|---|---|
| 2,278,037 | A | | 3/1942 | McIntire |
| 2,438,101 | A | | 3/1948 | Wright |
| 2,884,478 | A | | 4/1959 | Becker et al. |
| 2,942,314 | A | | 6/1960 | Debner et al. |
| 3,033,412 | A | | 5/1962 | Fox |
| 3,136,515 | A | | 6/1964 | Potruch |
| 3,173,987 | A | | 3/1965 | Potruch |
| 3,181,217 | A | * | 5/1965 | Bohlinger et al. ......... 24/116 A |
| 3,310,623 | A | | 3/1967 | Vaughan |
| 3,404,217 | A | | 10/1968 | Kelly |
| 3,432,129 | A | * | 3/1969 | Santucci ..................... 248/69 |
| 3,520,988 | A | | 7/1970 | Ballock, Sr. |
| 3,626,495 | A | | 12/1971 | Bastian, Jr. |
| 3,796,304 | A | | 3/1974 | Blais |
| 3,961,835 | A | | 6/1976 | Huang et al. |
| 3,991,960 | A | | 11/1976 | Tanaka |
| 4,023,758 | A | | 5/1977 | Yuda |
| 4,123,012 | A | | 10/1978 | Hough |

(Continued)

OTHER PUBLICATIONS

U.S. Design Appl. No. 29/271,161, filed Jan. 10, 2007, Brian Judd.

(Continued)

*Primary Examiner*—Robert J Sandy
(74) *Attorney, Agent, or Firm*—Jones Day; Brett Lovejoy

(57) ABSTRACT

A cable organizer having a centerpiece, a first loop portion, and a second loop portion is provided. The first loop portion defines a first bore adapted to receive at least one cable therein. It also includes a first end that abuts a first side of the centerpiece to close the first bore. This first end is deflectable for radial insertion of the at least one cable winding within the first bore. The second loop portion defines a second bore for at least one cable winding. The second loop portion includes a second end that abuts a second side of the centerpiece to close the second bore. This second end is also deflectable for radial insertion of the at least one cable winding within the bore. The first and second sides of the centerpiece oppose each other. The centerpiece prevents torsional opening of the first and second bores.

20 Claims, 8 Drawing Sheets

U.S. PATENT DOCUMENTS

| | | | |
|---|---|---|---|
| D253,457 S | 11/1979 | Sandel | |
| D257,613 S | 12/1980 | Gruenewald | |
| D262,183 S | 12/1981 | Brown et al. | |
| D270,329 S | 8/1983 | Hardy | |
| 4,407,472 A | 10/1983 | Beck | |
| D272,802 S | 2/1984 | Dall-Winther | |
| 4,475,649 A | 10/1984 | Haarbosch | |
| 4,513,864 A | 4/1985 | Liebel | |
| 4,667,824 A | 5/1987 | Ditchfield | |
| D295,724 S | 5/1988 | Shioda | |
| D295,725 S | 5/1988 | Shioda | |
| 4,779,816 A | 10/1988 | Varlet | |
| 4,837,899 A | 6/1989 | Young | |
| D311,487 S | 10/1990 | Platt | |
| 4,979,614 A | 12/1990 | Ruhaut | |
| 4,984,685 A | 1/1991 | Douglas | |
| 5,027,478 A | 7/1991 | Suhr | |
| 5,079,802 A | 1/1992 | Blase et al. | |
| 5,129,514 A | 7/1992 | Lilley, Jr. | |
| D330,323 S | 10/1992 | Hu | |
| 5,210,973 A | 5/1993 | Kratky et al. | |
| 5,238,113 A | 8/1993 | Parrott et al. | |
| 5,328,384 A | 7/1994 | Magnuson | |
| 5,388,314 A * | 2/1995 | Vella | 24/555 |
| D363,211 S | 10/1995 | Noble | |
| 5,469,607 A * | 11/1995 | Henningsson et al. | 24/716 |
| 5,507,544 A | 4/1996 | McQuade et al. | |
| D371,508 S | 7/1996 | Sagol | |
| 5,577,932 A | 11/1996 | Palmer | |
| 5,581,850 A | 12/1996 | Acker | |
| D378,053 S | 2/1997 | Forbis | |
| D380,145 S | 6/1997 | Rumpel | |
| D387,652 S | 12/1997 | Carlson, Jr. | |
| 5,697,131 A * | 12/1997 | Hunt et al. | 24/563 |
| 5,704,473 A | 1/1998 | Oster | |
| 5,738,313 A | 4/1998 | Rinke | |
| 5,881,436 A | 3/1999 | Lyons | |
| 5,937,488 A * | 8/1999 | Geiger | 24/339 |
| 6,059,241 A | 5/2000 | Martone | |
| 6,131,200 A | 10/2000 | McNamara | |
| 6,298,525 B1 | 10/2001 | Margo | |
| 6,324,722 B1 | 12/2001 | Takemoto | |
| 6,367,118 B1 | 4/2002 | Berfield | |
| 6,425,543 B1 | 7/2002 | King | |
| 6,499,781 B1 * | 12/2002 | Flynn | 294/159 |
| 6,581,763 B2 | 6/2003 | Allgood et al. | |
| 6,622,352 B2 | 9/2003 | Herron | |
| D482,269 S | 11/2003 | Martello | |
| 6,698,068 B2 | 3/2004 | Autterson | |
| 6,802,480 B1 | 10/2004 | Martello | |
| 6,842,949 B2 | 1/2005 | Warren | |
| 6,886,796 B1 | 5/2005 | Elander | |
| 6,961,979 B2 | 11/2005 | Wendle | |
| 7,055,784 B2 | 6/2006 | Stigler | |

OTHER PUBLICATIONS

International Search Report and Written Opinion dated Aug. 11, 2008 for International Application No. PCT/US07/00630.

* cited by examiner

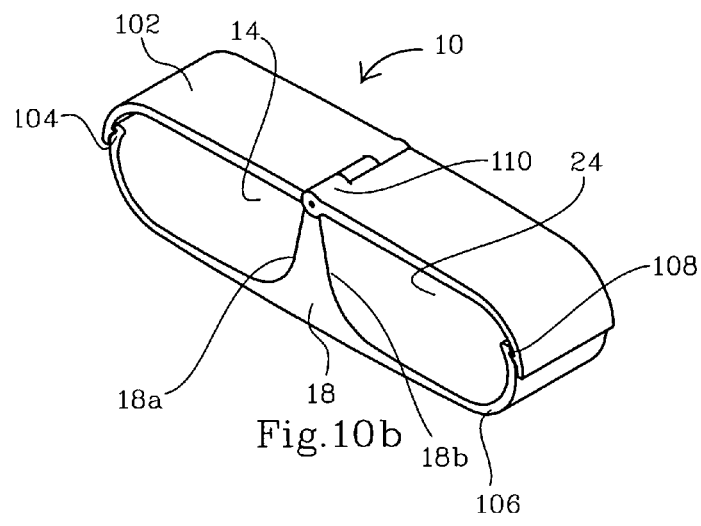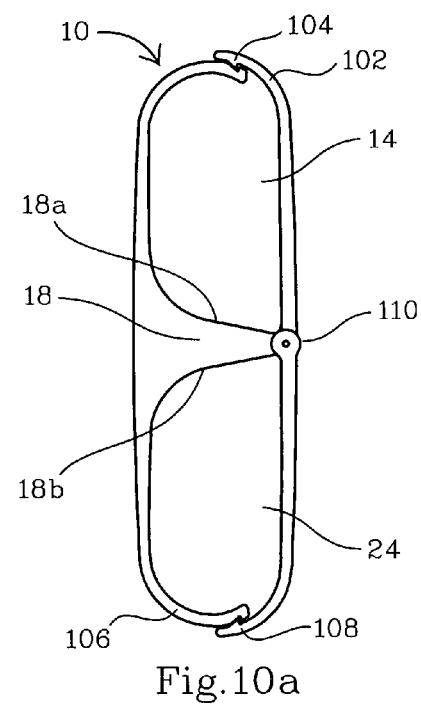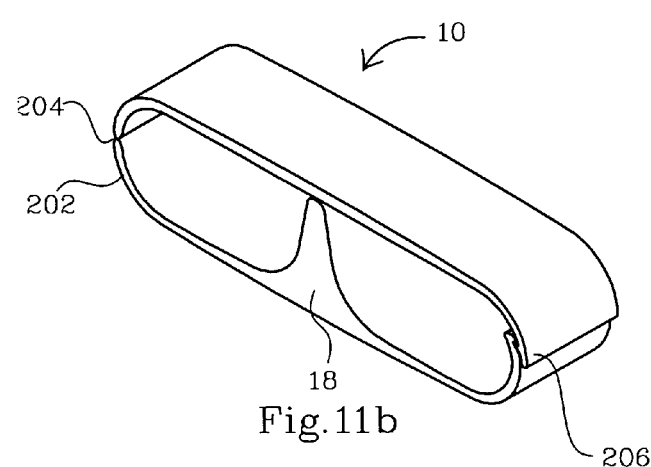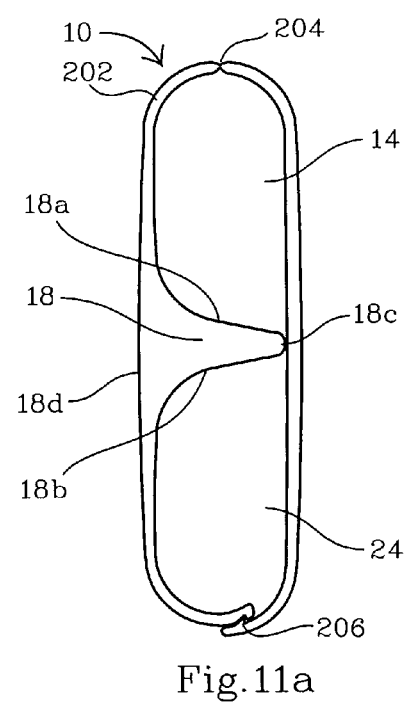

CABLE ORGANIZER

CROSS REFERENCE TO RELATED APPLICATIONS

This application claims priority to U.S. provisional patent application No. 60/757,766, filed Jan. 10, 2006, which is hereby incorporated by reference herein in its entirety. This application further claims priority to U.S. provisional patent application No. 60/802,818, filed May 22, 2006, which is hereby incorporated by reference herein in its entirety.

TECHNICAL FIELD

A device for storing a cable is provided. More particularly, the device forms a double loop. The loops are joined by a torsionally resistant center piece. Each formed loop has a flexible opening leading to a bore that is used to store multiple cable windings of one or more cables.

BACKGROUND ART

Cables, cords, wires, ropes, air hoses, and other elongate flexible items, collectively referred to herein as "cables," are prone to entanglement with other objects, people and each other. This presents a particular problem in packaging such cables for sale and, more generally, for storage of such cables. This problem has been addressed in the art in a number of different ways, including winding the cable up and then using fasteners such as plastic ties or VELCRO® (fabric hook and loop fasteners) to secure the cable. The cable is then released by untying or cutting or otherwise loosening the fasteners. The problem with such approaches is that it does not provide a satisfactory way to secure the cable, for example, during periods of nonuse. Typically, ties must be cut to release the cable, and thus are not reusable. In some instances, fasteners such as ties or VELCRO® are reusable. However, in many instances such reusable fasteners are unsatisfactory because the process of reusing them is laborious. Further, many conventional fasteners, whether they are reusable or not, do not provide sufficient structure to prevent twisting of the cables. In some instances, a sufficient number of fasteners are used to prevent a cable from twisting, but such approaches have the drawback of being cumbersome and laborious.

Given the above background, what is needed in the art are improved devices for securing cables.

SUMMARY OF THE INVENTION

One aspect of the invention provides a cable organizer comprising a reinforced centerpiece, a first loop portion, and a second loop portion. The reinforced centerpiece has a first and second side, and a first and second longitudinal end. The first loop portion defines a first bore that is adapted to receive at least one cable winding therein. The first loop portion includes a first end that abuts the first side of the reinforced centerpiece to close the first bore. The first end is deflectable for radial insertion of the at least one cable winding within the first bore. The second loop portion defines a second bore. The second bore is adapted to receive at least one cable winding therein. The second loop portion includes a second end that abuts the second side of the reinforced centerpiece to close the second bore. The second end is deflectable for radial insertion of the at least one cable winding within the second bore. The first side of the reinforced centerpiece is on an opposite side of the reinforced centerpiece than the second side of the reinforced centerpiece. The reinforced centerpiece prevents torsional opening of the first and second bores. In some embodiments, the reinforced centerpiece, the first loop portion, and the second loop portion are integrally formed from a single band of material.

In some embodiments, termed "S" configuration embodiments, the first end of the first loop portion is adjacent to the first longitudinal end of the reinforced centerpiece and the second end of the second loop portion is adjacent to the second longitudinal end of the reinforced centerpiece. In some embodiments, termed "3" configuration embodiments, the first end of the first loop portion and the second end of the second loop portion are both adjacent to the first longitudinal end of the reinforced centerpiece.

In some embodiments, the first end of the first loop portion and the first side of the reinforced centerpiece are ratcheted so that they interlock. In some embodiments, the first end of the first loop portion and the first side of the reinforced centerpiece are ratcheted so that they interlock and the second end of second loop portion and the second side of the reinforced centerpiece are ratcheted so that they interlock.

In some embodiments, the first loop portion includes a first hinge or a first pin to facilitate deflection of the first end from the first side of the reinforced centerpiece for radial insertion of the at least one cable winding within the first bore. In some embodiments, the first loop portion includes a first hinge or first pin to facilitate deflection of the first end from the first side of the reinforced centerpiece for radial insertion of the at least one cable winding within the first bore and the second loop portion includes a second hinge or a first pin to facilitate deflection of the second end from the second side of the reinforced centerpiece for radial insertion of the at least one cable winding within second bore.

In some embodiments, the reinforced centerpiece comprises a handle to facilitate carrying the cable organizer and/or to facilitate the storage of larger cables. The cable organizer can be dimensioned and configured to hold various sized bundles of cables. The size of such bundles are determined by both the diameter of the cable itself and the number of times the cable is wound. The cable organizer can be dimensioned and configured for a wide range of cable diameters (e.g., diameters ranging from 0.1 mm to 100 cm) and for any number of windings of such cable (e.g., 1 winding to 1000 windings). In some embodiments, the cable organizer is molded from a flexible high memory plastic such as, for example, Acetal, nylon 6, or nylon 6,6. In some embodiments, the first bore is dimensioned to permit at least two, three, four, five, six, seven, or more cable windings therein. In some embodiments, the first bore is dimensioned to permit at least two, three, four, five, six, seven, or more cable windings therein and the second bore is also dimensioned to permit at least two, three, four, five, six, seven, or more cable windings therein.

In some embodiments, the first end has a radial resistance with respect to the first side of the reinforced centerpiece of at least 1 pound-force ($lb_f$), at least 2 $lb_f$, at least 3 $lb_f$, at least 4 $lb_f$, at least 5 $lb_f$, or at least 6 $lb_f$. In some embodiments, the first end has a radial resistance with respect to the first side of the reinforced centerpiece of at least 1 $lb_f$, at least 2 $lb_f$, at least 3 $lb_f$, at least 4 $lb_f$, at least 5 $lb_f$, or at least 6 $lb_f$ and the second end has a radial resistance with respect to the second side of the reinforced centerpiece of at least 1 lb$_f$, at least 2 lb$_f$, at least 3 lb$_f$, at least 4 lb$_f$, at least 5 lb$_f$, or at least 6 lb$_f$.

BRIEF DESCRIPTION OF THE DRAWINGS

The features and advantages of the present invention will be better understood by reference to the following detailed description, which should be read in conjunction with the accompanying drawings.

FIG. 10a is a front view of a cable organizer in accordance with a tenth embodiment.

FIG. 10b is a perspective view of a cable organizer in accordance with a tenth embodiment.

FIG. 11a is a front view of a cable organizer in accordance with an eleventh embodiment.

FIG. 11b is a perspective view of a cable organizer in accordance with an eleventh embodiment.

Like reference numerals refer to corresponding parts throughout the several views of the drawings.

DETAILED DESCRIPTION OF THE INVENTION

A cable organizer, generally indicated by the numeral 10 in the accompanying Figures, is designed to organize by fastening a cable C. Although most figures do not show the cable so that the features of the cable organizer 10 can be more clearly shown, FIG. 2c does provide an illustration of cable organizer 10 with a cable C. As can be seen in FIG. 2c, cable organizer 10 supports multiple windings of cable C. In this way a cable is advantageously stored in cable organizer 10. With cable organizer 10, the cable is held in the center as illustrated in FIG. 2c and thus loses its tendency to twist or angle when transported. In fact, cable organizer 10 can support (hold) windings of multiple cables. For instance, cable organizer 10 can support multiple windings of 1, 2, 3, 4, 5, 6, 7, 8, 9, or 10 or more different cables, where each such cable has the same or different length and the same or different thickness (e.g., diameter). For ease of discussion, however, such cable, whether it is a plurality of different cables or not, will be referred to herein in the singular tense.

Figure 1A:
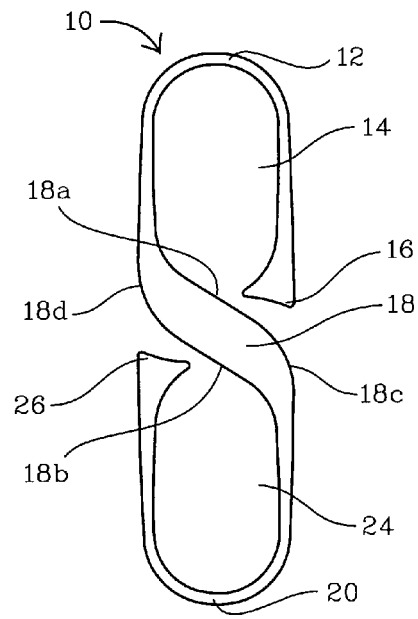
FIG. 1a is a front view of a cable organizer, in a closed configuration, in accordance with a first embodiment.
Figure 1B:
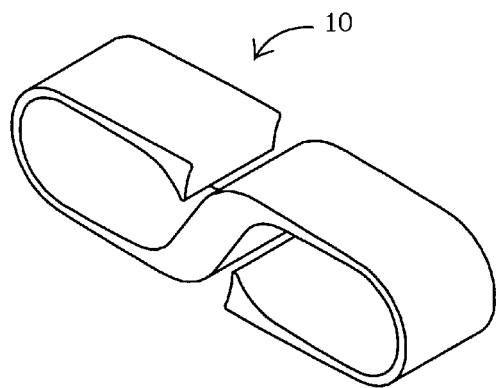
FIG. 1b is a perspective view of a cable organizer, in a closed configuration, in accordance with a first embodiment.
Figure 1C:
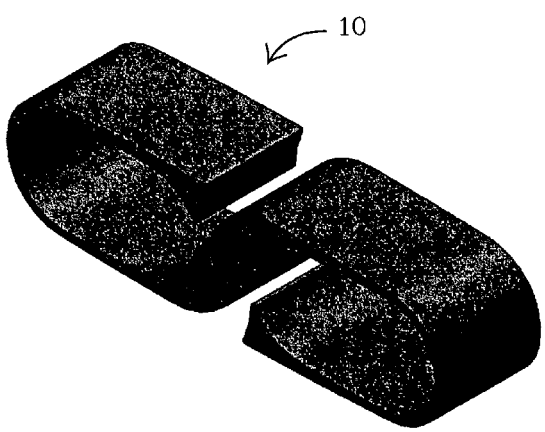
FIG. 1c is a shaded perspective view of a cable organizer, in a closed configuration, in accordance with a first embodiment.
Figure 1D:
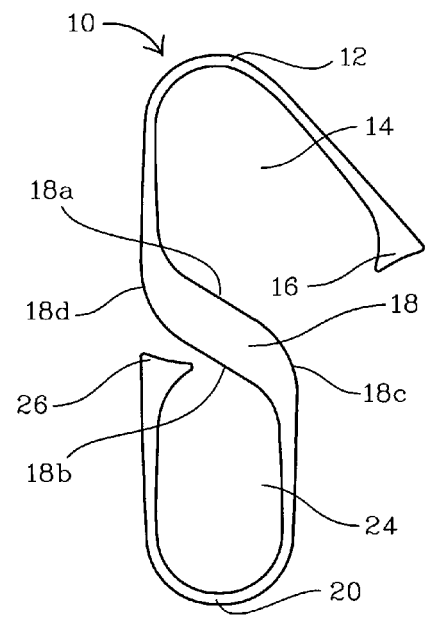
FIG. 1d is a shaded perspective view of a cable organizer, in an open configuration, in accordance with a first embodiment.

Central to cable organizer 10 is a reinforced centerpiece 18 which prevents the cable from slipping out of the organizer. Thus, referring to FIG. 2c, even if an attempt to pull the cable out of cable organizer 10 were made, reinforced centerpiece 18 would prevent the cable from slipping out of the organizer. Furthermore, reinforced centerpiece 18 prevents torsional opening of first bore 14 and second bore 24. That is, referring for example to FIGS. 1a and 2c, reinforced centerpiece 18 cannot be twisted in order to open first bore 14 or second bore 24. Referring to FIG. 1a, reinforced centerpiece 18 has a first side 18a, a second side 18b, a first longitudinal end 18c and a second longitudinal end 18d. Cable organizer 10 further includes a first loop portion 12 which defines first bore 14. As will be appreciated, first bore 14 may vary in size and shape to accommodate one or more windings of one or more cables. As such, cable organizer 10 can be dimensioned and configured for a wide range of cable diameters (e.g., diameters ranging from 0.1 mm to 100 cm) and for any number of windings of such cable (e.g., 1 winding to 1000 windings). First bore 14 is adapted to receive at least one cable winding therein. First loop portion 12 includes a first end 16 that abuts first side 18a of reinforced centerpiece 18 to close first bore 14. First end 16 is deflectable for radial insertion of the at least one cable winding within first bore 14. For instance, FIG. 1a shows cable organizer 10 in a closed position and FIG. 1d shows the cable organizer in an open position where end 16 has been deflected out. Upon release of loop 12 when in the configuration illustrated in FIG. 1d, end 16 will regain the configuration illustrated in FIG. 1a.

Cable organizer 10 includes a second loop portion 20 defining a second bore 24. Second bore 24 is adapted to receive at least one cable winding therein. Second loop portion 20 includes a second end 26 that abuts second side 18b of reinforced centerpiece 18 to close second bore 24. Second end 26 is deflectable for radial insertion of the at least one cable winding within second bore 24. As illustrated in FIG. 1a, first side 18a and first side 18b are on opposite sides of reinforced centerpiece 18.

First loop portion 12 may be formed of a flexible material such that it may be displaced to allow a cable winding to be inserted between end portion 16 and centerpiece 18. Thus, end portion 16 may be pulled outward, as illustrated in FIG. 1d, to create an opening for the passage of the cable C into bore 14. Likewise, second loop portion 24 may be formed of a flexible material such that it may be displaced to allow a cable winding to be inserted between end portion 26 and centerpiece 18. Thus, end portion 26 may be pulled outward to create an opening for the passage of the cable C into bore 24. In some embodiments, first loop portion 12 and second loop portion 24 are formed of a flexible material when such loop portions do not include a flexible hinge or pin and a latch. Thus, in embodiments in which first loop portion 12 and second loop portion 24 do not contain one or more hinges or one or more pins, the deflectable property of the loop portions arises by making them out of a material that has memory (e.g., returns to original form when stretched or pulled). An example of such material is Acetal. Acetal, also known as polyacetal, polyoxymethylene (POM), or polyformaldehyde, is an engineering polymer. Because of its strength, modulus, and resistance to impact and fatigue, it can be used as a weight-saving metal replacement. Acetal is available as a homopolymer (such as DuPont DELRIN®) or copolymer (such as Ticona's CELCON®) and either homopolymers or copolymers of Acetal can be used to form first loop portion 12 and second loop portion 24, or more generally, cable organizer 10. As will be discussed in more detail below, when first loop portion 12 and second loop portion 24 include one or more flexible hinges or pins, as well as latches, the loop portions can be made of a nonflexible material or a flexible material.

In some embodiments, reinforced centerpiece 18, first loop portion 12, and second loop portion 20 are integrally formed from a single band of material. In some embodiments, all or a portion of cable organizer 10 is made of a material that has memory, such as Acetal, nylon 6, or nylon 6,6. In some embodiments, all or a portion of cable organizer 10 is made of plastic.

In some embodiments, cable organizer 10 is made of material such as rubber, a rubberlike material, a rubber derivative, silicone rubber, or an elastomer. As used herein the term elastomer is used to describe both natural and synthetic materials which are elastic or resilient and in general resemble natural rubber in feeling and appearance. See, for example, Avallone and Baumeister III, *Marks' Standard Handbook for Mechanical Engineers*, McGraw Hill, 1987, which is hereby incorporated by reference herein for the purpose of providing examples of suitable plastics that can be used to make cable organizer 10. In some embodiments, such cable organizers 10 have a break-away property as is desirable in many applications such as medical applications. Thus, in such embodiments, the cable organizer 10 will release the cable when it is pulled with a threshold amount of force. The threshold amount of force needed is application dependent and, advantageously, the cable organizers 10 of the present invention can be engineered to have any desired threshold amount of force needed for the break-away.

In some embodiments, cable organizer 10 is made of natural rubber, vulcanized rubber, a butadiene-styrene polymer such as GR-S, NEOPRENE® (polychloroprene), nitrile rubbers, butyl, polysulfide rubber, ethylene-propylene rubber, polyurethane rubber, silicone rubber, gutta-percha, and/or balata. In some embodiments cable organizer 10 is made of silicone rubber. Silicone rubber is a rubberlike material having a tensile strength of between 400 lb/in$^2$ to 700 lb/in$^2$ (2.78 to 4.85×10$^6$ N/m$^2$) elongation. In some embodiments, cable organizer 10 is made of SILASTIC® silicone rubber (Dow Corning). In some embodiments, cable organizer 10 is made of a metal having high memory properties.

In some embodiments, reinforced centerpiece 18, first loop portion 12, and second loop portion 20 are each made of the same material. In fact, in some embodiments, the entirety of cable organizer 10 is made of the same material. In some embodiments, reinforced centerpiece 18, first loop portion 12, and second loop portion 20 are made out of different materials. In some embodiments, cable organizer 10 is made out of a plastic or a rubber. In some embodiments, cable organizer 10 is made out of high-density polyethylene, low-density polyethylene, polypropylene, cellulose acetate, vinyl, plasticized vinyl, cellulose acetate butyrate, melamine-formaldehyde, polyester, nylon. See, for example, *Modern Plastics Encyclopedia*, McGraw-Hill.

In preferred embodiments, at least first loop portion 12 and second loop portion 20 are made of a rigid, inflexible material, such as a thermoplastic material, e.g., such as Acetal. In particular embodiments, at least first loop portion 12, and second loop portion 20 are made of high memory flexible plastic, such as Acetal (e.g., DELRIN®, E.I. du Pont De Nemours and Company), nylon 6, or nylon 6,6, so that first end 16 and second end 26 return to the closed positions illustrated in FIG. 1a after they have been pulled open to permit one or more cable windings. In some embodiments, cable organizer 10 is made of high molecular weight polyethylene, polyetheretherketone (PEEK), polyetherketoneketone (PEKK), polymethyl-methacrylate (PMMA), polytetrafluoroethylene (PTFE), crystalline plastics, or polyoxymethylene.

In some embodiments, the cable stored in cable organizer 10 is an extension cord, air hose, water hose, tubing, insulated or noninsulated electric wire of any gauge (e.g., gauge 1 through 100), speaker cable, coaxial cable, optical fiber, or rope, which are all referred to herein as "cable." More generally, a cable as referred to herein is any elongated and flexible tubular or wirelike object. In some embodiments, such an elongated and flexible object is stored in cable organizer 10 in a multiple windings as illustrated in FIG. 2c.

Figure 5B:
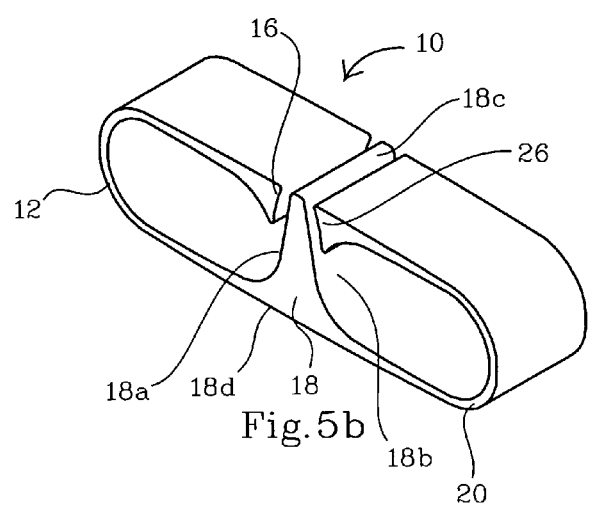
FIG. 5b is a perspective view of a cable organizer in accordance with the fifth embodiment.
Figure 5A:
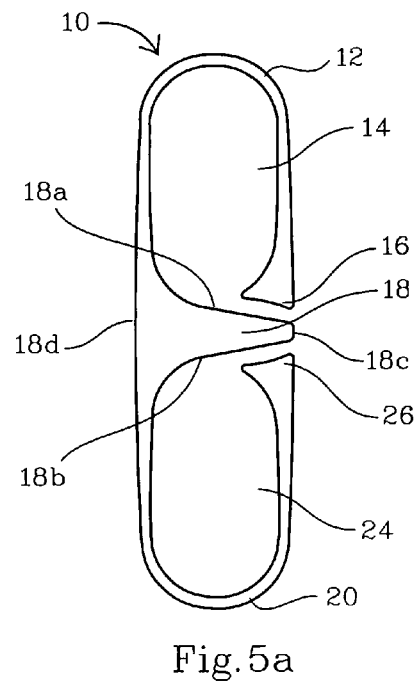
FIG. 5a is a front view of a cable organizer in accordance with a fifth embodiment.

Referring to FIG. 1, in some embodiments, termed "S" configuration embodiments, first end 16 of first loop portion 12 is adjacent to first longitudinal end 18c of reinforced centerpiece 18 and second end 26 of second loop portion 20 is adjacent to second longitudinal end 18d of reinforced centerpiece 18. In contrast, referring to FIG. 5, in some embodiments, termed "3" configuration embodiments, first end 16 of first loop portion 12 and second end 26 of second loop portion 20 are both adjacent to first longitudinal end 18c of reinforced centerpiece 18.

Figure 2B:
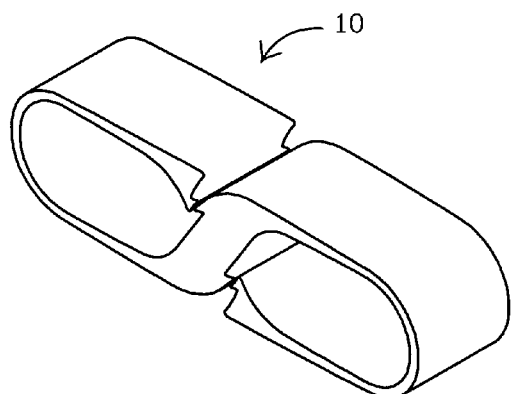
FIG. 2b is a perspective view of a cable organizer in accordance with a second embodiment.
Figure 2A:
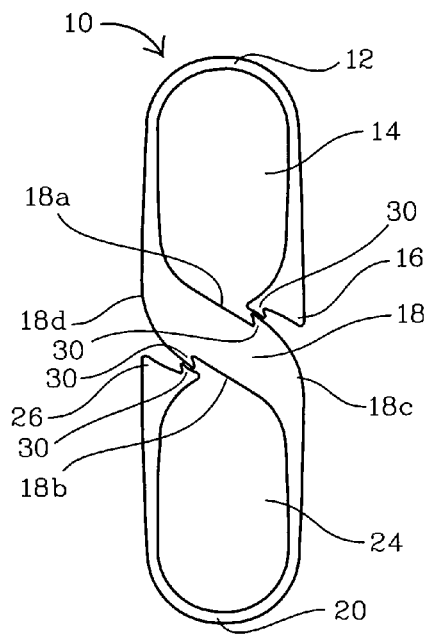
FIG. 2a is a front view of a cable organizer in accordance with a second embodiment.
Figure 2C:
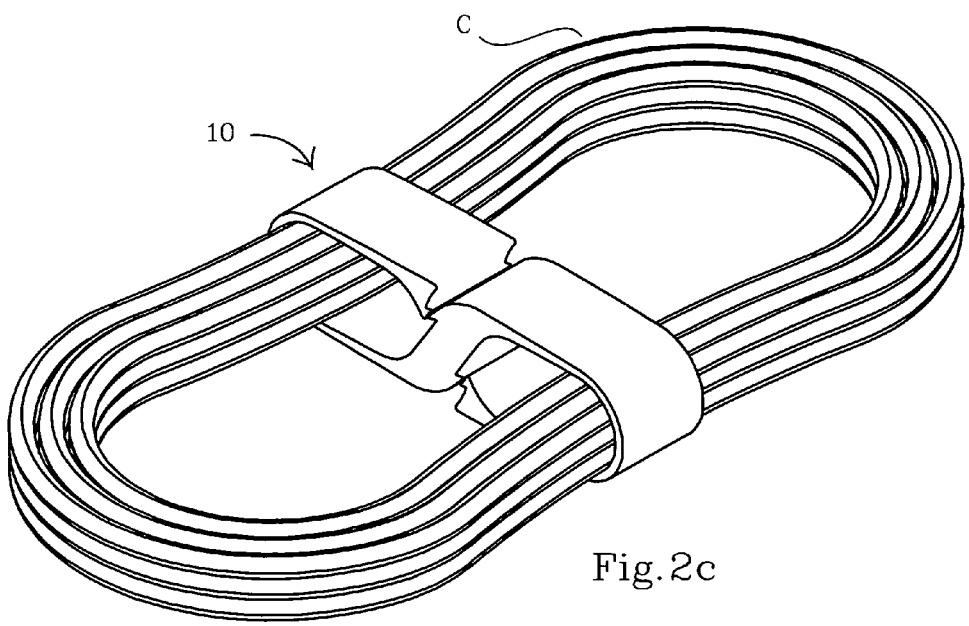
FIG. 2c is a perspective view of a cable organizer in accordance with a second embodiment, with a cable wound within the cable organizer.

Referring to FIG. 2, in some embodiments, first end 16 of first loop portion 12 and first side 18a of reinforced centerpiece 18 are ratcheted so that they interlock. In such embodiments, to open first loop portion 12, first end 16 is pushed radially inward towards bore 14 to unhook interlocking teeth 30. Once teeth 30 are no longer interlocking, first end 16 may be pulled out as described above in conjunction with FIG. 1. Further referring to FIG. 2, in some embodiments, second end 26 of second loop portion 20 and second side 18b of reinforced centerpiece 18 are ratcheted so that they interlock. In such embodiments, to open second loop portion 20, second end 26 is pushed radially inward towards bore 24 to unhook interlocking teeth 30. Once teeth 30 are no longer interlocking, second end 26 may be pulled out as described above in conjunction with FIG. 1. Advantageously, in preferred embodiments in accordance with FIG. 2, loops 12 and 20 are made of a high memory flexible plastic so that they return to a closed state after they have been pulled to an open position. They can then be locked into position by pushing down on ends 16 and 26 in order to once again interlock teeth 30. In embodiments where such a ratcheting feature is used, there is no requirement that the material used to make cable organizer 10 be out of high memory flexible materials. In fact, in such embodiments, particularly embodiments in which a hinge 50 or pin 60 is provided in loops 12 and 20, material that has no particular memory properties can be used to make cable organizer 10. In fact, in embodiments where a ratcheting feature is used such as, for example, in the embodiments illustrated by FIG. 2, 3, 4, 6, 7, or 8, any resilient material can be used to make cable organizer 10 including, but not limited to, metals, plastics, or wood.

Figure 3B:
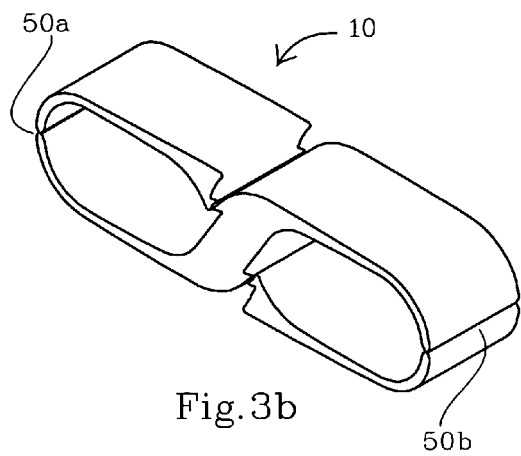
FIG. 3b is a perspective view of a cable organizer in accordance with the third embodiment.
Figure 3A:
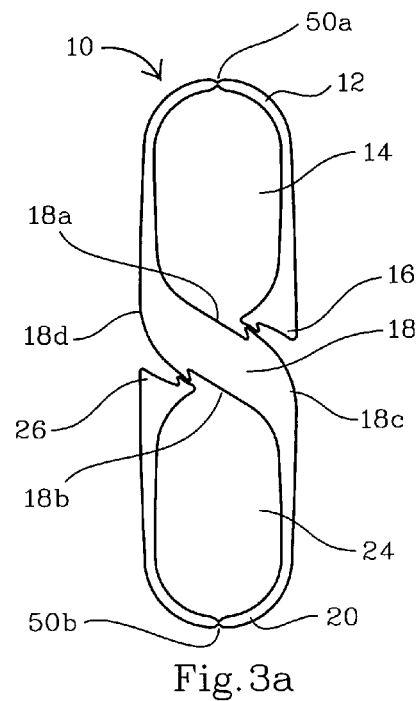
FIG. 3a is a front view of a cable organizer in accordance with a third embodiment.
Figure 4B:
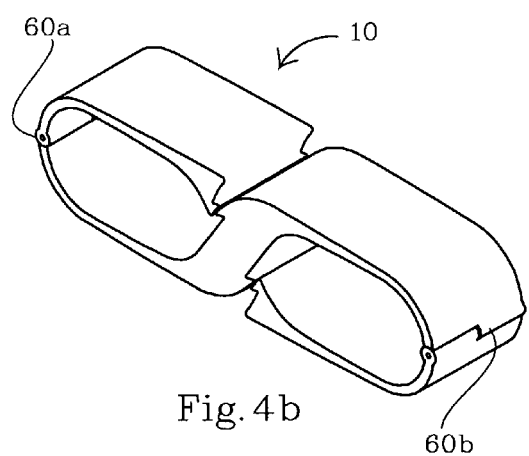
FIG. 4b is a perspective view of a cable organizer in accordance with the fourth embodiment.
Figure 4A:
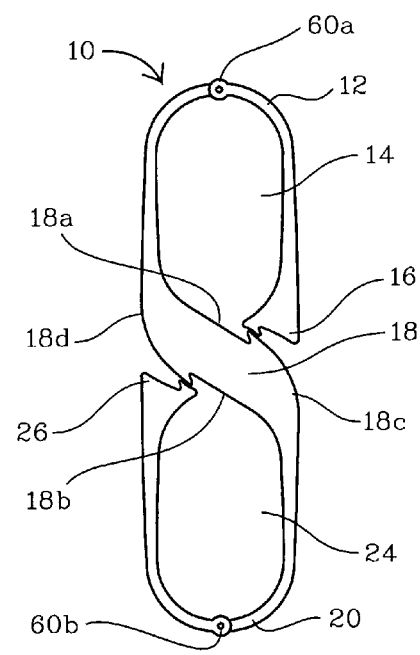
FIG. 4a is a front view of a cable organizer in accordance with a fourth embodiment.

Referring to FIGS. 3 and 4, in some embodiments, first loop portion 12 includes a first hinge 50a (FIG. 3) or a first pin 60a (FIG. 4) to facilitate deflection of first end 16 from first side 18a of reinforced centerpiece 18 for radial insertion of at least one cable winding within first bore 14. In some embodiments, second loop portion 20 includes a second hinge 50b (FIG. 3) or a first pin 60b (FIG. 4) to facilitate deflection of second end 26 from second side 18b of reinforced centerpiece 18 for radial insertion of at least one cable winding within second bore 24.

Figure 6B:
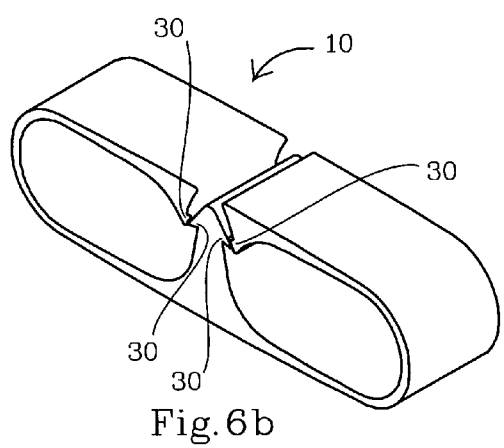
FIG. 6b is a perspective view of a cable organizer in accordance with the sixth embodiment.
Figure 6A:
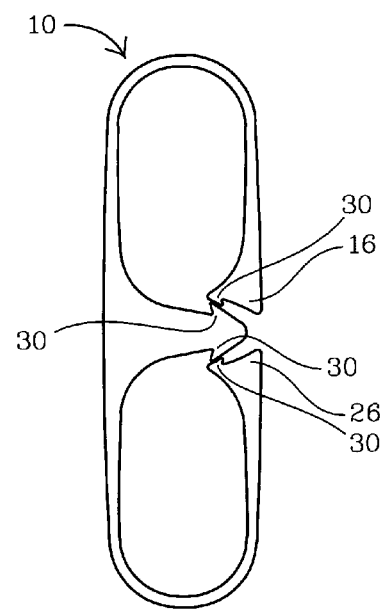
FIG. 6a is a front view of a cable organizer in accordance with a sixth embodiment.
Figure 7B:
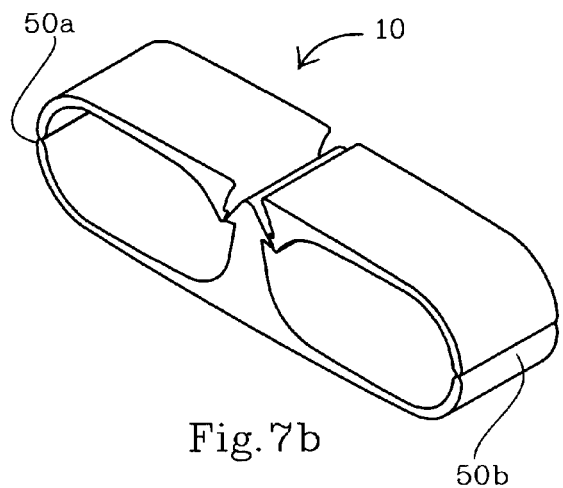
FIG. 7b is a perspective view of a cable organizer in accordance with the seventh embodiment.
Figure 7A:
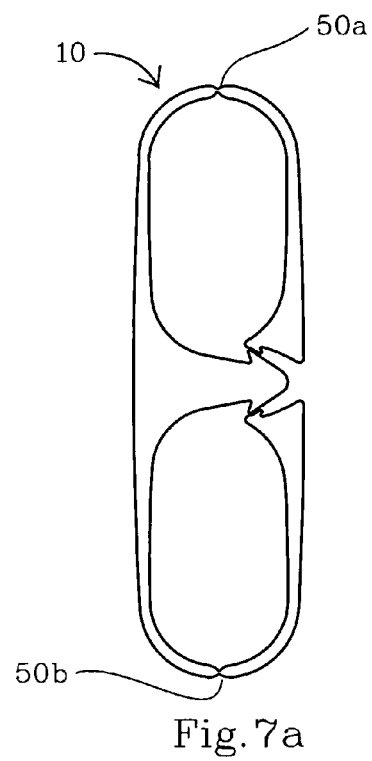
FIG. 7a is a front view of a cable organizer in accordance with a seventh embodiment.
Figure 8B:
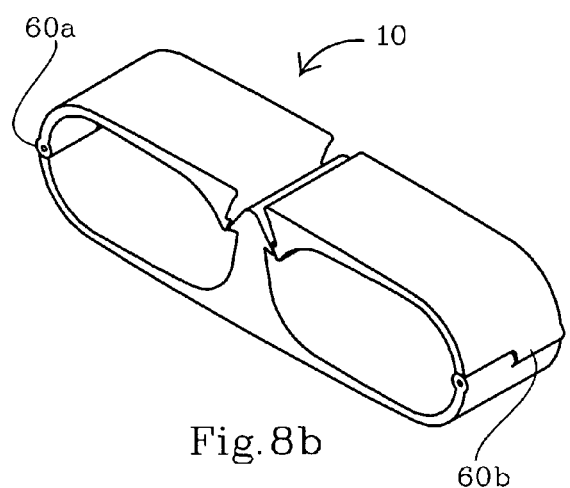
FIG. 8b is a perspective view of a cable organizer in accordance with an eight embodiment.
Figure 8A:
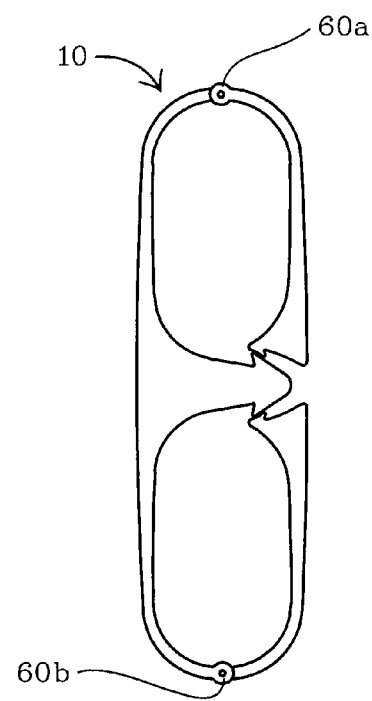
FIG. 8a is a front view of a cable organizer in accordance with an eight embodiment.
Figure 9A:
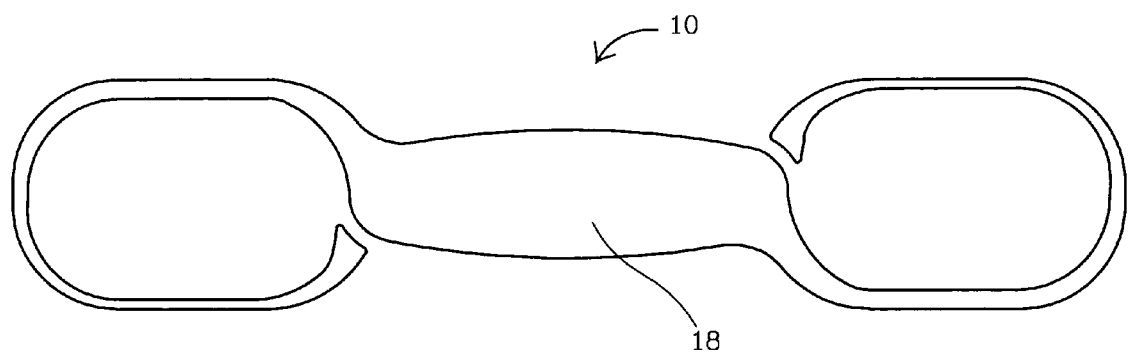
FIG. 9a is a front view of a cable organizer in accordance with a ninth embodiment.
Figure 9B:
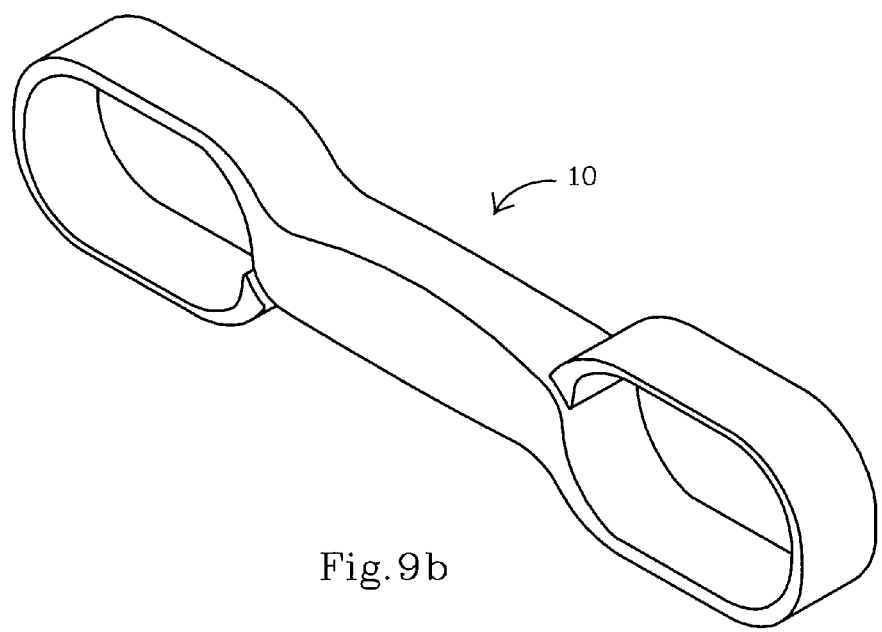
FIG. 9b is a perspective view of a cable organizer in accordance with a ninth embodiment.

Referring to FIG. 9, in some embodiments, reinforced centerpiece 18 comprises a handle to facilitate carrying cable organizer 10 and/or to facilitate the storage of larger cables. As illustrated in FIG. 6, in some embodiments cable organizers 10 of the "3" configuration have ratcheted ends As illustrated in FIG. 7, in some embodiments cable organizers 10 of the "3" configuration have hinges 50. As illustrated in FIG. 8, in some embodiments cable organizers 10 of the "3" configuration have pins 60.

In some embodiments, first bore 14 is dimensioned to permit at least one cable winding, at least two cable windings, at least three cable windings, at least four cable windings, at least five cable windings, at least twenty cable windings, or between 2 and 20 cable windings therein. In some embodiments, second bore 24 is dimensioned to permit at least one cable winding, at least two cable windings, at least three cable windings, at least four cable winding, at least five cable windings, at least twenty cable windings, or between 2 and 20 cable windings therein.

In some embodiments, first end 16 has a radial resistance with respect to first side 18a of reinforced centerpiece 18 of at least 1 pound-force ($lb_f$), at least 2 $lb_f$, at least 3 $lb_f$, at least at least 4 $lb_f$, at least 5 $lb_f$, or between 0.1 $lb_f$ and 10 $lb_f$. In some embodiments, second end 26 has a radial resistance with respect to second side 18b of reinforced centerpiece 18 of at least 1 pound-force ($lb_f$), at least 2 $lb_f$, at least 3 $lb_f$, at least at least 4 $lb_f$, at least 5 $lb_f$, or between 0.1 $lb_f$ and 10 $lb_f$.

Referring to FIG. 10, in some embodiments, cable organizer 10 comprises a reinforced centerpiece 18 having a first side 18a and a second side 18b. The cable organizer 10 illustrated in FIG. 10 further comprises a first loop portion 102. The first loop portion 102 defines a first bore 14. First bore 14 is adapted to receive at least one cable winding therein. First loop portion 102 includes a first latch 104. First latch 104 is capable of being in an open configuration (not shown in FIG. 10) for radial insertion of at least one cable winding within first bore 14. First latch 104 is also capable of being in a closed configuration for storage of at least one cable within first bore 14. The cable organizer 10 illustrated in FIG. 10 further includes a second loop portion 106 that defines a second bore 24. Second bore 24 is adapted to receive at least one cable winding therein. Second loop portion 106 includes a second latch 108. Second latch 108 is capable of being in an open configuration for radial insertion of at least one cable winding within second bore 24. Second latch is also capable of being in a closed configuration for storage of at least one cable winding within second bore 24. First loop portion 102 is on first side 18a of reinforced centerpiece 18 and second loop portion 106 is on second side 18b of reinforced centerpiece as illustrated in FIG. 10. First loop portion 102 and second loop portion 106 are joined to reinforced centerpiece 18 by pin 110. Pin 110 facilitates movement between the closed and open configuration of first latch 104 as well as movement between the closed and open configuration of second latch 108. As in the case in the embodiments illustrated in FIGS. 1-9, the reinforced centerpiece 18 of the embodiment illustrated in FIG. 10 prevents torsional opening of first latch 104 and second latch 108. The cable organizer 10 illustrated in FIG. 10 can be made of any of the materials disclosed herein, including the flexible materials or resilient materials disclosed herein.

Figure 12B:
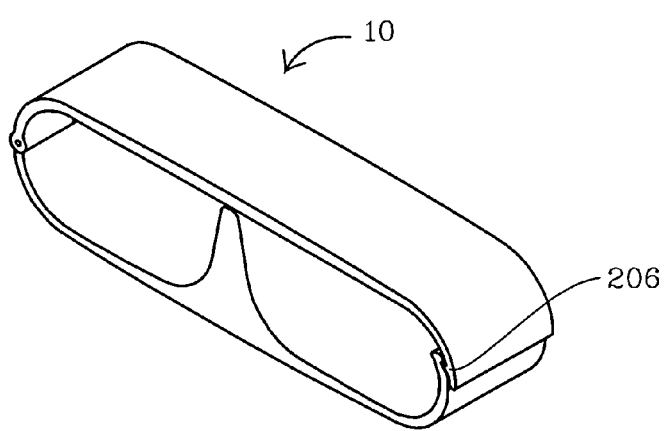
FIG. 12b is a perspective view of a cable organizer in accordance with a twelfth embodiment.
Figure 12A:
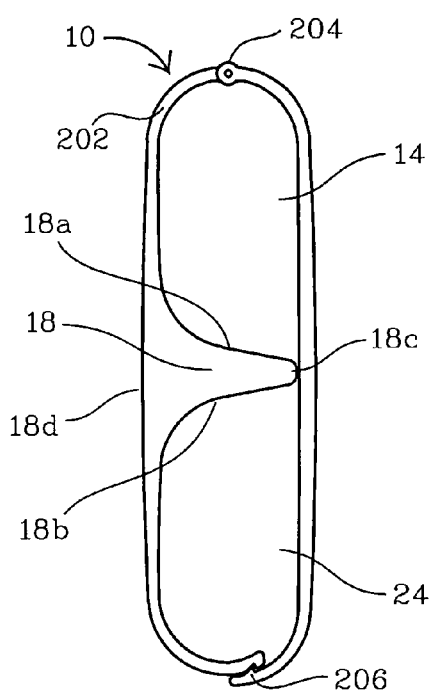
FIG. 12a is a front view of a cable organizer in accordance with a twelfth embodiment.

Referring to FIGS. 11 and 12, in some embodiments cable organizer 10 comprises a reinforced centerpiece 18 having a first side 18a, a second side 18b, a first longitudinal end 18c and a second longitudinal end 18d, where the first side 18a and the second side 18b of the reinforced centerpiece 18 are on opposite sides of the centerpiece. The cable organizer 10 further comprises a first loop portion 202 joined to at least the second longitudinal end 18d of the reinforced centerpiece 18, the first loop portion 202 encompassing the reinforced centerpiece 18 such that the first loop portion 202 defines a first bore 14 on the first side 18a of reinforced centerpiece 18 and a second bore 24 on the second side 18b of reinforced centerpiece 18. First loop portion 202 comprises a hinge (FIG. 11) or pin (FIG. 12) 204 on a part of the first loop portion that defines first bore 14. First loop portion 202 comprises a clasp 206 on a part of the first loop portion 202 that defines second bore 24. Hinge or pin 204 facilitates movement between (i) an open position (not illustrated in FIG. 11 or 12), in which first loop portion 202 does not contact first longitudinal end 18c of reinforced centerpiece 18, the open position for radial insertion of at least one cable winding within first bore 14 and/or at least one cable winding within second bore 24 and (ii) a closed position, in which first loop portion 202 contacts first longitudinal end 18c of reinforced centerpiece 18, the closed position for storage of at least one cable winding within first bore 14 and at least one cable winding within second bore 24. As in the case in the embodiments illustrated in FIGS. 1-9, the reinforced centerpieces 18 of the embodiments illustrated in FIGS. 11 and 12 prevent torsional opening of latch 206. The cable organizers 10 illustrated in FIGS. 11 and 12 can be made of any of the materials disclosed herein, including the flexible materials or resilient materials disclosed herein.

All references cited herein are incorporated herein by reference in their entirety and for all purposes to the same extent as if each individual publication or patent was specifically and individually indicated to be incorporated by reference in its entirety for all purposes.

The foregoing descriptions of specific embodiments of the present invention are presented for purposes of illustration and description. They are not intended to be exhaustive or to limit the invention to the precise forms disclosed. Obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A cable organizer comprising:
   a solid unapertured reinforced centerpiece having a first side, a second side, a first longitudinal end and a second longitudinal end;

a first loop portion, the first loop portion defining a first bore, wherein the first bore is adapted to receive at least one cable winding therein, and wherein the first loop portion includes a first end that abuts the first side of the solid unapertured reinforced centerpiece to close the first bore, the first end being deflectable for radial insertion of the at least one cable winding within the first bore; and a second loop portion, the second loop portion defining a second bore, wherein the second bore is adapted to receive at least one cable winding therein, and wherein the second loop portion includes a second end that abuts the second side of the solid unapertured reinforced centerpiece to close the second bore, the second end being deflectable for radial insertion of the at least one cable winding within the second bore, wherein the solid unapertured reinforced centerpiece has a thickness and a length, the thickness having a cross-section greater than a cross-section thickness of the first loop portion or the second loop portion, wherein the first side and the second side of the solid unapertured reinforced centerpiece are on opposite sides of the solid unapertured reinforced centerpiece and are separated from each other by the thickness of the solid unapertured reinforced centerpiece, and wherein the first longitudinal end and the second longitudinal end are separated from each other by the length of the solid unapertured reinforced centerpiece;

the solid unapertured reinforced centerpiece prevents torsional opening of the first bore and the second bore; and a shape and dimension of the first bore and the second bore is the same thereby allowing for insertion of an equal number of cable windings into the first bore and the second bore.

2. The cable organizer of claim 1, wherein the solid unapertured reinforced centerpiece, said first loop portion, and said second loop portion are integrally formed from a single band of material.

3. The cable organizer of claim 1, wherein
the first end of the first loop portion is adjacent to the first longitudinal end of the solid unapertured reinforced centerpiece; and
the second end of the second loop portion is adjacent to the second longitudinal end of the solid unapertured reinforced centerpiece.

4. The cable organizer of claim 1, wherein
the first end of the first loop portion is adjacent to the first longitudinal end of the solid unapertured reinforced centerpiece; and
the second end of the second loop portion is adjacent to the first longitudinal end of the solid unapertured reinforced centerpiece.

5. The cable organizer of claim 1, wherein
said first end of the first loop portion and the first side of the solid unapertured reinforced centerpiece are ratcheted so that they interlock.

6. The cable organizer of claim 1, wherein
said first end of the first loop portion and the first side of the solid unapertured reinforced centerpiece are ratcheted so that they interlock; and
said second end of second loop portion and the second side of the solid unapertured reinforced centerpiece are ratcheted so that they interlock.

7. The cable organizer of claim 1, wherein the solid unapertured reinforced centerpiece comprises a solid unapertured handle.

8. The cable organizer of claim 1, wherein the cable organizer is molded from a high memory flexible plastic.

9. The cable organizer of claim 8, wherein the high memory flexible plastic is Acetal, nylon 6, or nylon 6,6.

10. The cable organizer of claim 9, wherein the first bore is dimensioned to permit at least two cable winding therein.

11. The cable organizer of claim 1, wherein
the first bore and the second bore are each dimensioned to permit at least two cable windings therein.

12. The cable organizer of claim 1, wherein
the first bore and the second bore are each dimensioned to permit at least five cable windings therein.

13. The cable organizer of claim 1, wherein the first end has a radial resistance with respect to the first side of the solid unapertured reinforced centerpiece of at least 1 pound-force ($lb_f$).

14. The cable organizer of claim 1, wherein
the first end has a radial resistance with respect to the first side of the solid unapertured reinforced centerpiece of at least 1 $lb_f$; and
the second end has a radial resistance with respect to the second side of the solid unapertured reinforced centerpiece of at least 1 $lb_f$.

15. The cable organizer of claim 1, wherein the first end has a radial resistance with respect to the first side of the solid unapertured reinforced centerpiece of at least 5 $lb_f$.

16. The cable organizer of claim 1, wherein
the first end has a radial resistance with respect to the first side of the solid unapertured reinforced centerpiece of at least 5 $lb_f$; and
the second end has a radial resistance with respect to the second side of the solid unapertured reinforced centerpiece of at least 5 $lb_f$.

17. A cable organizer comprising:
a solid reinforced centerpiece having a first side, a second side, a first longitudinal end and a second longitudinal end;
a first loop portion, the first loop portion defining a first bore, wherein the first bore is adapted to receive at least one cable winding therein, and wherein the first loop portion includes a first end that abuts the first side of the solid reinforced centerpiece to close the first bore, the first end being deflectable for radial insertion of the at least one cable winding within the first bore; and
a second loop portion, the second loop portion defining a second bore, wherein the second bore is adapted to receive at least one cable winding therein, and wherein the second loop portion includes a second end that abuts the second side of the solid reinforced centerpiece to close the second bore, the second end being deflectable for radial insertion of the at least one cable winding within the second bore, wherein
the solid reinforced centerpiece has a thickness and a length, wherein the first side and the second side of the solid reinforced centerpiece are on opposite sides of the solid reinforced centerpiece and are separated from each other by the thickness of the solid reinforced centerpiece, and wherein the first longitudinal end and the second longitudinal end are separated from each other by the length of the solid reinforced centerpiece;
the solid reinforced centerpiece prevents torsional opening of the first bore and the second bore; and
a shape and dimension of the first bore and the second bore is the same thereby allowing for insertion of an equal number of cable windings into the first bore and the second bore, wherein the first loop portion includes a first hinge to facilitate deflection of the first end from the first side of the solid reinforced centerpiece for radial insertion of the at least one cable winding within the first bore.

18. A cable organizer comprising:
   a solid reinforced centerpiece having a first side, a second side, a first longitudinal end and a second longitudinal end;
   a first loop portion, the first loop portion defining a first bore, wherein the first bore is adapted to receive at least one cable winding therein, and wherein the first loop portion includes a first end that abuts the first side of the solid reinforced centerpiece to close the first bore, the first end being deflectable for radial insertion of the at least one cable winding within the first bore; and
   a second loop portion, the second loop portion defining a second bore, wherein the second bore is adapted to receive at least one cable winding therein, and wherein the second loop portion includes a second end that abuts the second side of the solid reinforced centerpiece to close the second bore, the second end being deflectable for radial insertion of the at least one cable winding within the second bore, wherein
   the solid reinforced centerpiece has a thickness and a length, wherein the first side and the second side of the solid reinforced centerpiece are on opposite sides of the solid reinforced centerpiece and are separated from each other by the thickness of the solid reinforced centerpiece, and wherein the first longitudinal end and the second longitudinal end are separated from each other by the length of the solid reinforced centerpiece;
   the solid reinforced centerpiece prevents torsional opening of the first bore and the second bore; and
   a shape and dimension of the first bore and the second bore is the same thereby allowing for insertion of an equal number of cable windings into the first bore and the second bore, wherein
      the first loop portion includes a first hinge to facilitate deflection of the first end from the first side of the solid reinforced centerpiece for radial insertion of the at least one cable winding within the first bore; and
      the second loop portion includes a second hinge to facilitate deflection of the second end from the second side of the solid reinforced centerpiece for radial insertion of the at least one cable winding within second bore.

19. A cable organizer comprising:
   a solid reinforced centerpiece having a first side, a second side, a first longitudinal end and a second longitudinal end;
   a first loop portion, the first loop portion defining a first bore, wherein the first bore is adapted to receive at least one cable winding therein, and wherein the first loop portion includes a first end that abuts the first side of the solid reinforced centerpiece to close the first bore, the first end being deflectable for radial insertion of the at least one cable winding within the first bore; and
   a second loop portion, the second loop portion defining a second bore, wherein the second bore is adapted to receive at least one cable winding therein, and wherein the second loop portion includes a second end that abuts the second side of the solid reinforced centerpiece to close the second bore, the second end being deflectable for radial insertion of the at least one cable winding within the second bore, wherein
   the solid reinforced centerpiece has a thickness and a length, wherein the first side and the second side of the solid reinforced centerpiece are on opposite sides of the solid reinforced centerpiece and are separated from each other by the thickness of the solid reinforced centerpiece, and wherein the first longitudinal end and the second longitudinal end are separated from each other by the length of the solid reinforced centerpiece;
   the solid reinforced centerpiece prevents torsional opening of the first bore and the second bore; and
   a shape and dimension of the first bore and the second bore is the same thereby allowing for insertion of an equal number of cable windings into the first bore and the second bore, wherein
      the first loop portion includes a pin to facilitate deflection of the first end from the first side of the solid reinforced centerpiece for radial insertion of the at least one cable winding within the first bore.

20. A cable organizer comprising:
   a solid reinforced centerpiece having a first side, a second side, a first longitudinal end and a second longitudinal end;
   a first loop portion, the first loop portion defining a first bore, wherein the first bore is adapted to receive at least one cable winding therein, and wherein the first loop portion includes a first end that abuts the first side of the solid reinforced centerpiece to close the first bore, the first end being deflectable for radial insertion of the at least one cable winding within the first bore; and
   a second loop portion, the second loop portion defining a second bore, wherein the second bore is adapted to receive at least one cable winding therein, and wherein the second loop portion includes a second end that abuts the second side of the solid reinforced centerpiece to close the second bore, the second end being deflectable for radial insertion of the at least one cable winding within the second bore, wherein
   the solid reinforced centerpiece has a thickness and a length, wherein the first side and the second side of the solid reinforced centerpiece are on opposite sides of the solid reinforced centerpiece and are separated from each other by the thickness of the solid reinforced centerpiece, and wherein the first longitudinal end and the second longitudinal end are separated from each other by the length of the solid reinforced centerpiece;
   the solid reinforced centerpiece prevents torsional opening of the first bore and the second bore; and a shape and dimension of the first bore and the second bore is the same thereby allowing for insertion of an equal number of cable windings into the first bore and the second bore, wherein
   the first loop portion includes a first pin to facilitate deflection of the first end from the first side of the solid reinforced centerpiece for radial insertion of the at least one cable winding within the first bore; and
   the second loop portion includes a second pin to facilitate deflection of the second end from the second side of the solid reinforced centerpiece for radial insertion of the at least one cable winding within second bore.

* * * * *